US006083268A

United States Patent [19]

Kelsey et al.

[11] Patent Number: 6,083,268

[45] Date of Patent: Jul. 4, 2000

[54] METHOD FOR DESIGNING PNEUMATIC TIRES FOR ROLLING CONDITIONS

[75] Inventors: Sydney Kelsey, South Bend, Ind.; Thomas R. Branca, Bradford, Md.; Stephen M. Vossberg, Medina, Ohio

[73] Assignee: Bridgestone/Firestone, Inc., Akron, Ohio

[21] Appl. No.: 09/067,298

[22] Filed: Apr. 27, 1998

[51] Int. Cl.$^{7}$ .......... G06G 7/48

[52] U.S. Cl. .......... 703/7; 703/1; 703/8; 152/450; 73/146

[58] Field of Search .......... 395/500.28, 500.29, 395/500.01; 152/454, 450, 455; 73/146

[56] References Cited

U.S. PATENT DOCUMENTS

| | | | |
|---|---|---|---|
| 5,559,729 | 9/1996 | Abe | 395/500.23 |
| 5,710,718 | 1/1998 | Kamegawa et al. | 395/500.01 |
| 5,880,362 | 3/1999 | Tang et al. | 73/146 |
| 5,930,155 | 7/1999 | Tohi et al. | 395/500.29 |

OTHER PUBLICATIONS

Danielson, K.T.; Noor, A. K.; Green, J. S.;"Computational Strategies for Tire Modeling and Analysis", Computers & Structures, vol. 61, Issue 4, pp. 673–693, Nov. 1996.

*Primary Examiner*—Kevin J. Teska
*Assistant Examiner*—Douglas W. Sergent
*Attorney, Agent, or Firm*—John M. Vasuta

[57] ABSTRACT

A method for designing pneumatic tires for rolling conditions employs a finite element tire model configured by an operator. A first set of variables is applied to the tire model and steady state footprint conditions resulting from such application of the variables to the tire model are compared against predetermined footprint constraints to determine if the steady state footprint conditions and the footprint constraints have converged. If they have not, the set of control variables is incremented and the comparison is undertaken again until the steady state footprint conditions in the footprint constraints have converged. The concept of the invention is presented with particular application to a determination of the abrasion energy dissipation or wear potential, cornering stiffness, and residual aligning torque.

14 Claims, 6 Drawing Sheets

METHOD FOR DESIGNING PNEUMATIC TIRES FOR ROLLING CONDITIONS

TECHNICAL FIELD

The invention herein resides in the art of pneumatic tire design and manufacture. More particularly, the invention relates to a method and apparatus for modeling tire performance under various structural configurations and operational constraints. More specifically, the invention relates to a method and apparatus for employing finite element analysis for modeling tire performance in steady state rolling conditions.

BACKGROUND ART

In the past, the design of pneumatic tires was based primarily on the history and performance of similar pneumatic tires which had been previously designed. In other words, the data available to correlate structure with performance was primarily based upon prior physical structures which had actually been implemented, and from which test data had been obtained. With such a database, tire designers could extrapolate or project how particular design features would impact tire performance, such as wear, cornering, or residual self aligning torque. Of course, such tire modeling and design approaches were extremely costly and time consuming, and often given to error. Often, a design change seeking to improve one aspect of tire performance would be found to adversely impact another. Unfortunately, the discovery would not be made until the tire design was completed and test tires employed.

Recently, finite element analysis techniques have been employed to evaluate and assess the reactions of various structures to predetermined operational criteria. As is well know to those skilled in the art, a finite element analysis configures a particular structure as a matrix of connected nodes and assesses the reaction of those nodes under various preset conditions. While the concept of a finite element analysis assessment for tire structures has been employed in the static condition, it has heretofore not been routinely employed for assessing reactions in a rolling tire. Since the actions of interest with respect to tire design deal primarily with rotational movement of the tire, the utilization of finite element analysis techniques has, in the past, given but rudimentary analysis of the static tire footprint.

Since the primary mode of operation of a tire is that of a steady state rolling condition, it is most desired that an analysis of the tire in such steady state operation be attainable. The instant invention provides that capability.

DISCLOSURE OF INVENTION

In light of the foregoing, it is a first aspect of the invention to provide a method for designing pneumatic tires for rolling conditions, in which tire performance is modeled under steady state rolling conditions.

Another aspect of the invention is the provision of a method for designing pneumatic tires for rolling conditions which provides for improved tire design in the areas including cornering, wear and residual aligning torque.

Still a further aspect of the invention is the provision of a method for designing pneumatic tires for rolling conditions in which a control algorithm iteratively executes a finite element analysis of a staticly loaded tire.

Yet a further aspect of the invention is the provision of a method for designing pneumatic tires for rolling conditions in which corrective adjustments are imposed in a footprint model through successive iterations until convergence is achieved.

Yet another aspect of the invention is the provision of a method for designing pneumatic tires for rolling conditions which is readily implemented by employing presently existing finite element analysis techniques, and applying those techniques in an iterative and converging manner to achieve a desired design.

Yet another aspect of the invention is the provision of a method for designing pneumatic tires for rolling conditions in which static analyses may be employed to achieve rolling conditions without the need for modeling transient behavior.

The foregoing and other aspects which will become apparent herein are attained by a method for designing pneumatic tires for rolling conditions, comprising generating a finite element tire model, applying a first set of variables to the tire model, comparing steady state footprint conditions resulting from the application of the first set of variables to the tire model against predetermined footprint constraints to determine if the steady state footprint conditions and the footprint constraints have converged, and incrementing a set of control variables and repeating the step of comparing until the steady state footprint conditions and the footprint constraints have converged, wherein the steps of comparing and incrementing comprise iterating to convergence with steady state footprint algorithms at a set slip angle.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Those skilled in the art will appreciate that the modeling of a rolling tire is a difficult task. The number of variables, together with the large number of incremental steps required, make rolling tire modeling burdensome for tire design and optimization—particularly where many tire variations must be examined. Accordingly, it will be understood that the concept of the instant invention is to determine by analysis the detailed forces, stresses, strains and deflections present in a steady rolling tire by using static (non-rolling) tire modeling procedures and to apply those techniques to produce an improved tire for wear, cornering performance and residual self aligning torque. To achieve this objective, the concept of the invention is to employ computer simulations of the tire structure, linked in an iterative computational loop whose converged result is an accurate simulation of the steady rolling conditions. The result is attained by employing specific incremental changes in the tire loading and deformation variables that iteratively produce improved, better converged, solutions.

The concept of the invention relies upon the assessment of a steady rolling tire. In the context of the invention, steady rolling is defined as rolling where the set of all measurable tire variables—axle loads, internal stresses and strains, deformations, footprint shears, and footprint shapes—as viewed from a reference frame translating with the tire axis, are fixed and non-varying with time. This steady rolling condition may include, in addition to vertical forces, the side forces encountered in cornering, driving or braking torque, or any combination of forces. It is particularly noteworthy that in a laboratory, a tolling tire with fixed constraints and/or loads achieves a steady rolling condition after only a revolution or two. Notably, a typical vehicle tire achieves a steady rolling condition in a similar period of time following a fixed input from the operator. Accordingly, and as will be understood by those skilled in the art, most of the travel experienced by a tire is at, or approximately at, a steady rolling condition. Accordingly, for a significant portion of the tire analysis necessary for tire design, simulation of the steady rolling condition is desired.

Figure 1:
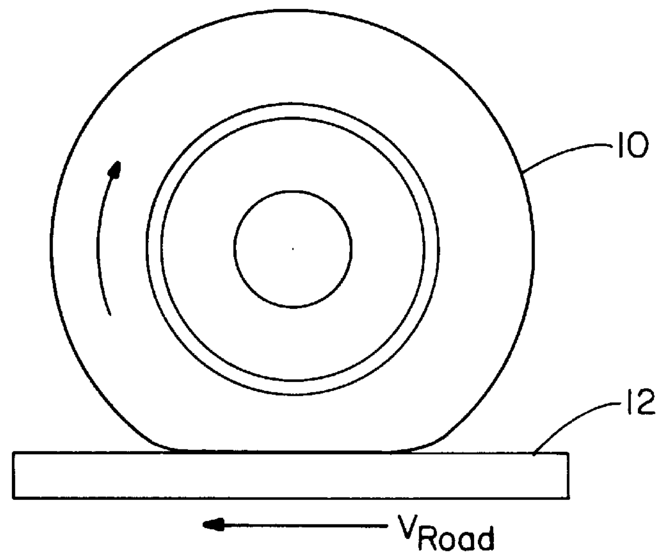
FIG. 1 is an illustrative view of a tire/road contact area.
Figure 2:
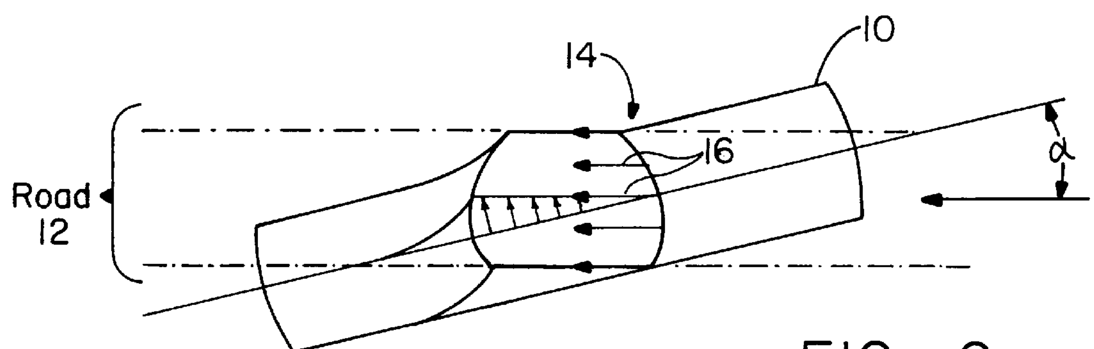
FIG. 2 is a tire footprint upon a road interface.
Figure 3A:
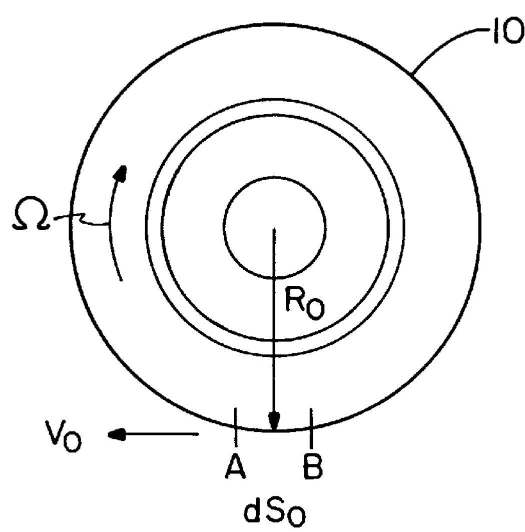
FIGS. 3A and 3B respectively present illustrations of rotating undeflected and rotating deflected tires, respectively, to illustrate footprint deformation.
Figure 3B:
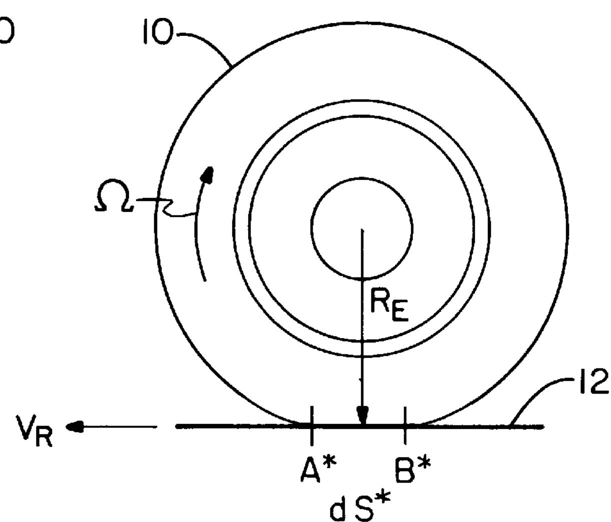

Consistent with commonly known techniques of finite element analysis, the present invention employs a technique that exerts specific, calculated, incremental, displacement controls on individual points of contact in the tire footprint. These points, or nodes, are the nodes typically assessed in a finite element analysis. The footprint nodes are part of the overall tire contacting the road simulation. To achieve a steady rolling prediction from the iterative static solution, the unique properties of the steady footprint form the basis for incremental displacement calculations. By assuming non-slip conditions at the tire-road interface and a rigid road surface, steady state kinematic conditions can be defined in the footprint. Such a footprint is shown in FIGS. 1 and 2, wherein the rolling tire 10 is shown upon a road surface 12, thereby establishing a contact patch 14 at the interface therebetween. In accordance with the invention, the kinematic condition in the footprint or contact patch 14 for steady non-slip state rolling are as follows:

1. All footprint contact nodes travel in straight trajectories 16 from leading to trailing footprint edges.
2. The trajectory 16 of the contact nodes are parallel and aligned in the direction of travel. This direction of travel may be at a cornering or slip angle $\alpha$ to the plane of the wheel. The straight trajectory is fully defined by the leading edge contact point and the slip angle.
3. As shown in FIGS. 3A and 3B, the stretch ratio $\lambda$, in the direction of the contact nodes trajectory 16, is uniform from leading to trailing footprint edges. In FIG. 3A, for the rotating undeflected tire, the trailing and leading footprint edges are designated by the capital letters A and B, respectively. Likewise, in FIG. 3B, for the rotating deflected tire, the trailing and leading footprint edges are designated by the letters A* and B*, respectively. The stretch ratio $\lambda$ is determined by the ratio between the effective rolling radius of the tire, which is expressed as $R_E=V_R/\Omega$, wherein $V_R$ is the road velocity relative to the tire's axle and $\Omega$ is the tire rotation velocity, and the inflated undeflected radius $R_O$ thereof according to the formula $\lambda=R_E/R_O\ V_R/V_O$, where $V_O$ is the rotating velocity of the undeflected tire.
4. A steady rolling continuity condition requires that the tractive shear stresses are zero at the footprint leading edge.

Figure 4A:
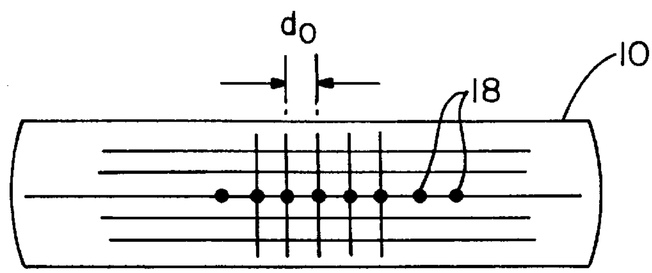
FIGS. 4A and 4B respectively present the tire tread of an inflated tire and the footprint of that tire at a slip angle alpha $\alpha$.
Figure 4B:
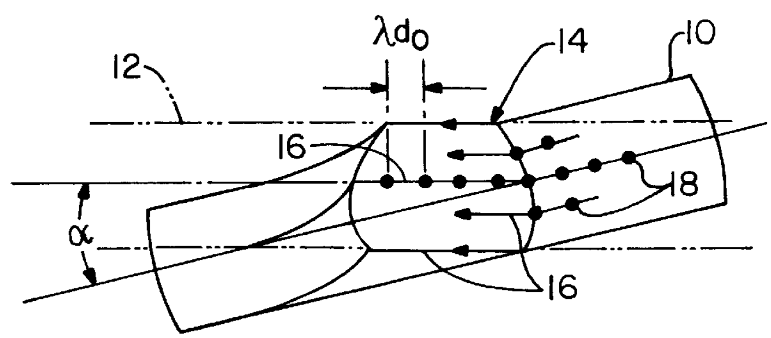

Summarizing these primary footprint constraints in FIG. 4A, it can be seen that there are straight line trajectories with a series of nodes 18 separated by a distance $d_o$ for an inflated tire. In FIG. 4B, which shows a rolling tire at a slip angle $\alpha$ for each of the nodes 18, there is uniform stretch ratio $\lambda$ across the trajectory line 16, and the leading shear edge stresses are zero.

In accordance with the invention, a finite element analysis prescribes the steady rolling footprint conditions presented above, while providing a means to obtain detailed equilibrium solutions for the statically deflected tire, together with the corresponding footprint shape, reaction forces and contact traction stresses. Presently available finite element analysis software is capable of performing exactly this function. The finite element analysis is undertaken upon a finite element tire model having the following characteristics:

1. The model is capable of representing the full footprint or contact patch 14 for specified inflation pressures and loads.
2. For consistency with steady rolling requirements, the tread of the tire model may be simulated by continuous circumferential tread ribs or plain tread. However, the structural influence of a tread pattern may be included in the model by constructing the tread with an equivalent orthotropic material, if available to the program or/analysis or provided by the vendor of the commercial fine element code.

In order to implement the iterative control loop that provides the steady rolling solution, the variables of the problem must be defined. In accordance with the present invention, three specific groups of such variables are addressed. A first group of variables are those typically specified by the user and include inflation pressure, camber angle, vertical force or deflection, slip angle or cornering/lateral force, and driving or braking force. As to these variables, the iterative scheme may be devised to converge to a specified vertical force or deflection and/or to converge to a specified cornering angle or lateral force. Another set of variables include the primary footprint constraint which, as discussed above, includes straight, parallel trajectories for the contact nodes to be assessed, a uniform stretch ratio $\lambda$ along any specific trajectory, and zero leading edge shear traction.

Finally, control variables include uniform vertical translation of the footprint or contact patch, uniform lateral and fore/aft translation of the footprint, lateral and fore/aft translation of individual nodal lines in the contact patch, and effective rolling radius.

It should now be apparent that the concept of the invention addresses user specified variables, primary footprint constraints, and primary control variables in association with a finite element analysis to iteratively loop and converge upon a solution to a specific design objective. In substance, the iterative technique begins with a static solution to establish the initial footprint or contact patch that results from the model with prescribed user specified variables. These are the independent variables of the solution, set at the beginning of the loop, and held constant thereafter. Once the initial footprint or contact patch has been established, the analysis enters the main iterative loop and incremental attempts to satisfy the footprint constraints by adjusting the control variables. These specific steps are set forth in the methodology of FIG. 5. As shown, the basic methodology of the invention is shown in flow chart form and designated generally by the numeral 20. When the program is entered at 22, the first step is to generate a tire model as at 24. Those skilled in the art will appreciate that the tire model is a finite element model with associated equations for assessing deflections, forces, stresses and strains of each of the nodes comprising the model. Such programs for generating finite element models are generally commercially available. At steps 26, 28 and 30, the user specified variables are set, such as tire inflation, radial load, slip angle and camber. With these conditions set, the solid state footprint (designated as "SSFP" in FIG. 5) conditions are checked at 32 to determine if they satisfy footprint constraints as a 34. If the steady state footprint conditions have not converged with the footprint constraints as at 36, the control variables are incremented as at 38 and the iterative loop of 32, 34, 36, 38 continues until convergence is attained as at 40 and the program terminates as at 42 with a solution.

Those skilled in the art will appreciate that the iterative loop makes adjustments to the footprint contact node location in the following manner:

1. Adjustment may be made to the vertical position of the footprint to preserve the total vertical force;
2. Adjustment may be made to the uniform lateral position of the footprint to reduce the average leading edge lateral sheer traction to zero;
3. Adjustment may be made to the uniform fore/aft position of the footprint to reduce the average leading edge fore/aft traction to zero;
4. Adjustment may be made to the slip angle α to preserve the specified lateral force;
5. Adjustment may be made to the effective rolling radius to preserve the specified driving or braking force;
6. Adjustment may be made to the lateral position of each leading edge node point to reduce the lateral sheer traction at the leading edge; and
7. Adjustment may be made to the fore/aft position of each leading edge node point to reduce the fore/aft sheer traction at the leading edge.

The contact node displacement adjustment may then be superimposed while preserving the straight and parallel trajectory requirements. A finite element solution is then obtained such that an improved approximation to the steady rolling footprint is obtained as the result of the adjusted road contact node displacements. This iterative loop continues, extracting revised nodal forces and displacements. It has been found that a reasonable convergence to a steady state rolling solution may be attained in from. 40–50 such loop cycles.

Figure 6A:
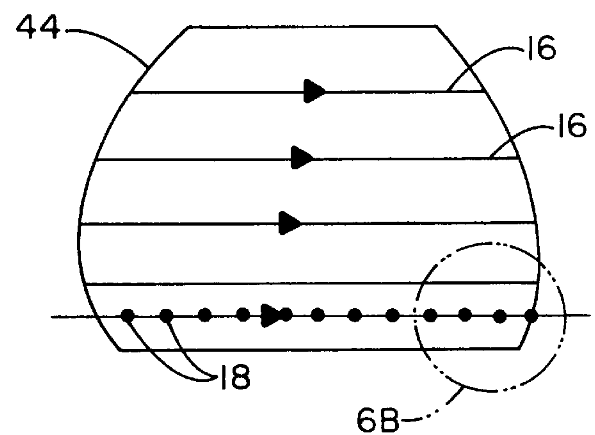
FIGS. 6A and 6B respectively present a tire footprint with finite friction, and an illustration of the slippage experienced by that tire.
Figure 6B:
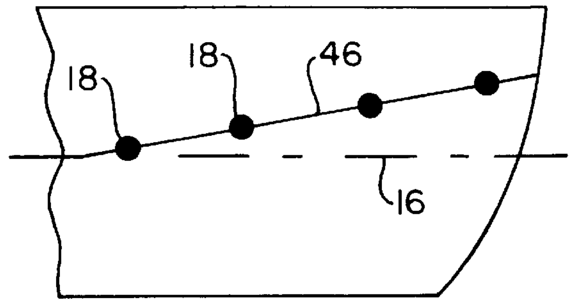

Those skilled in the art will readily appreciate that tread slip on the road surface is observed in steady rolling test tires and constitutes a portion of steady rolling conditions. Where slip is permitted in the solution by prescribing finite friction to the gap/contact element of the finite element model, the straight trajectory and uniform stretch steady rolling requirements must be relaxed in the zones of slippage. As shown in FIGS. 6A and 6B, with finite friction, the iterative control loop proceeds through the same steps as described above. Within each finite element solution, the gap element algorithm tests and allows slip where the sheer traction exceeds the friction limits. As illustrated in the drawings, a slip path 46 deviates from the standard straight line trajectory 16 of the contact path 44. Accordingly, the non-slip constraint conditions are not imposed at nodes 18 exceeding the slip conditions. The pattern of contact point slip will converge with the other variables of the solution. The utilization of finite friction slip displacement factors has been found to be particularly appropriate for tire wear analysis that is based on steady rolling solutions.

Figure 5:
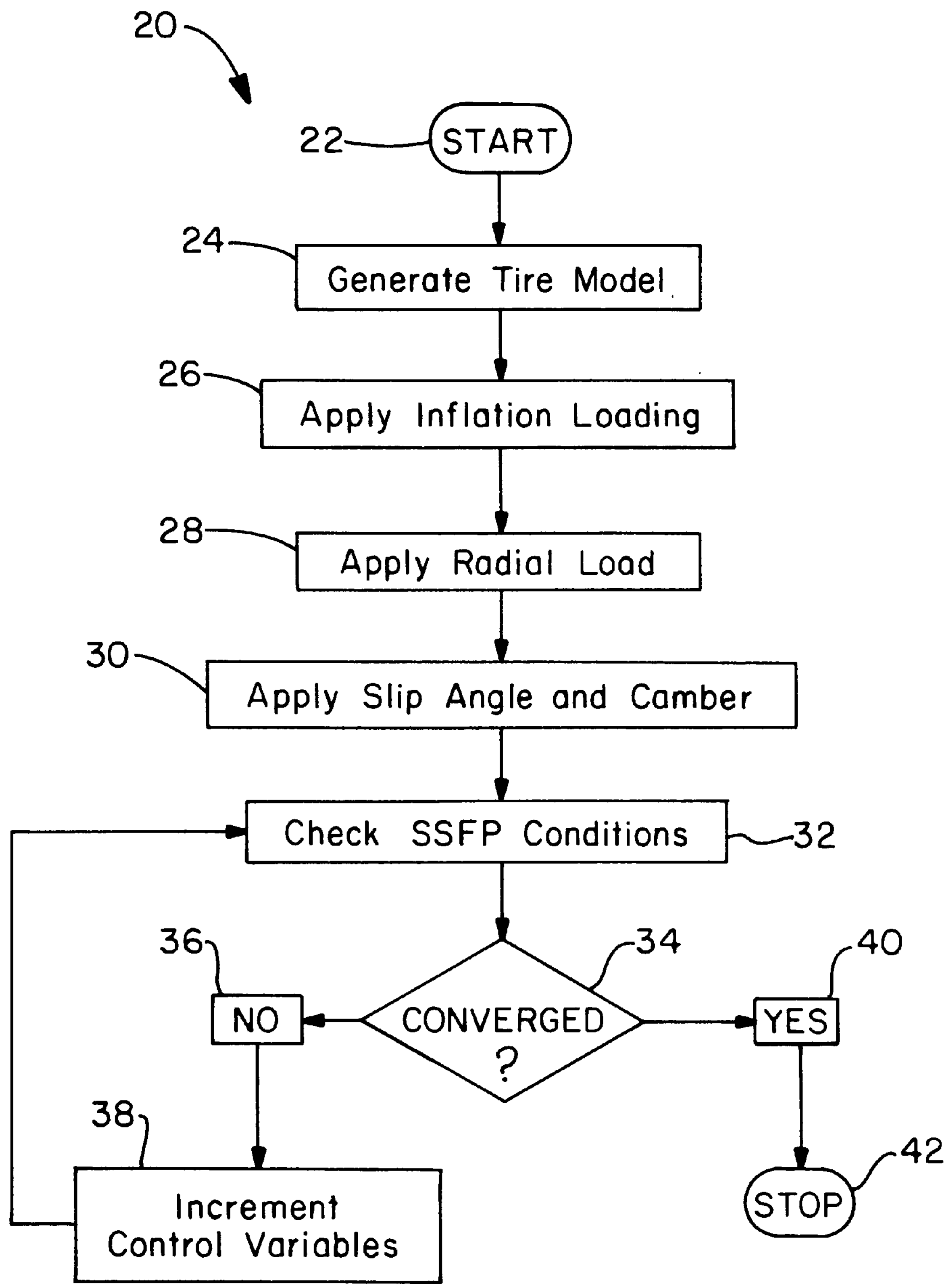
FIG. 5 is a flow chart of the general methodology of the invention for iterative steps to convergence on a desired tire design.
Figure 7:
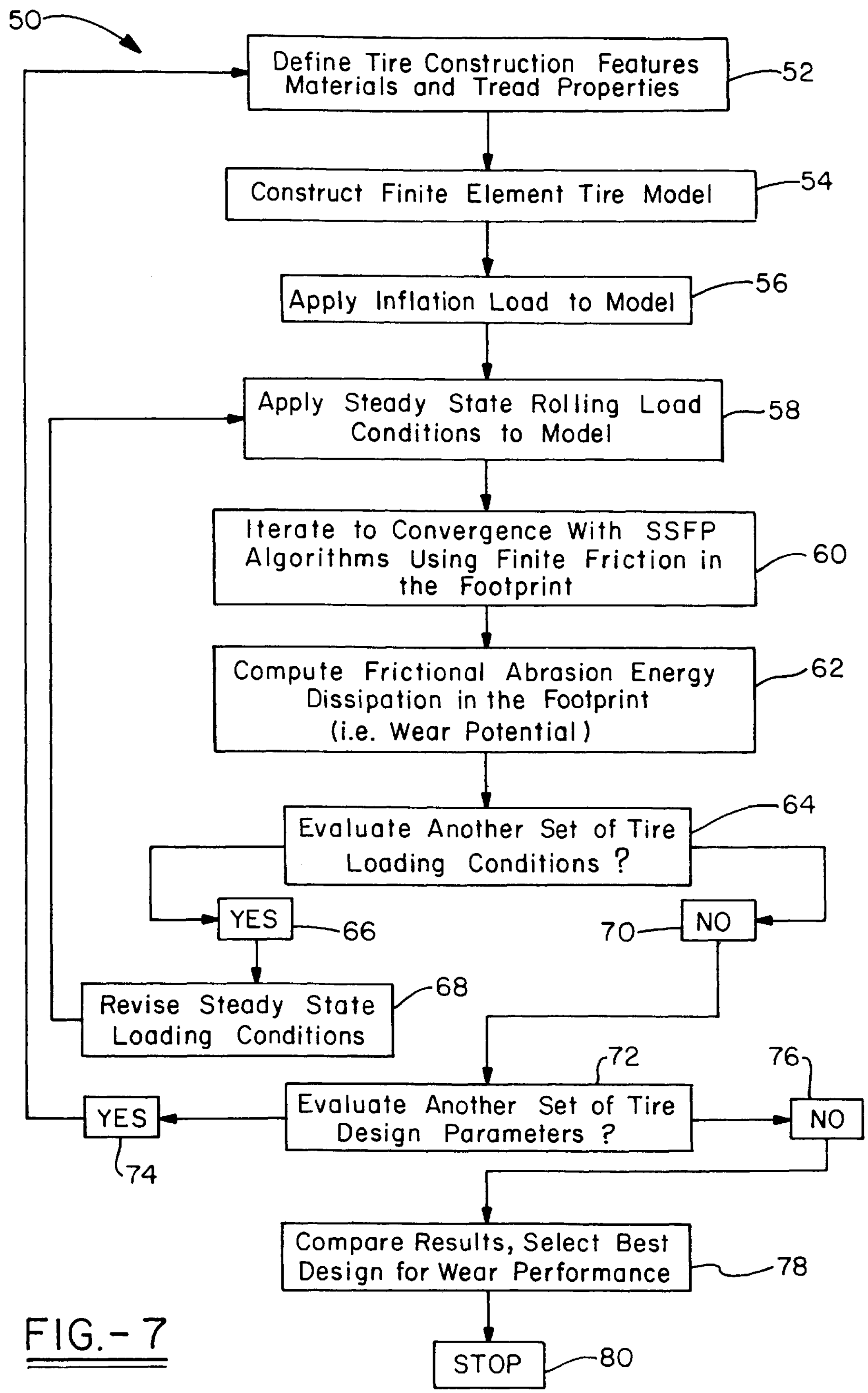
FIG. 7 is a flow chart for wear analysis according to the invention.

With an appreciation of the computational steps of the steady state footprint generally employed in accordance with the invention and as shown in FIG. 5, consideration of specific applications can now be undertaken. With reference now to FIG. 7, it can be seen that a method for attaining a finite element wear analysis is designated generally by the numeral 50. Here, the primary concern is design parameters for optimizing tire wear. At 52, the tire features are defined as to materials, tread properties, and the like. A finite element tire model is generated at 54 and the inflation load is applied to the model at 56. With these set criteria, the steady state rolling load conditions are set to the model at 58 and iteration to convergence with the steady state rolling footprint algorithm employing finite friction in the footprint is undertaken at 60. Upon such convergence, the frictional abrasion energy dissipated in the footprint is computed at 62. This is indicative of the wear potential of the specific tire configuration established above. If an evaluation of another set of tire loading conditions is desired at 64, such determination is made at 66 and the steady state loading conditions are revised at 68 and applied to the finite element tire model as at 58. Again, iterations to convergence with the solid state footprint algorithm (designated as "SSFP" in FIG. 7), using finite friction in the footprint, is undertaken at 60 and the wear potential is again determined at 62. Once all of the desired sets of tire loading conditions have been assessed, the loop just described is left at 70 and a determination is made at 72 as to whether another set of tire design parameters is desired. If the determination is made a 74 that such design parameters are to be considered, the process loops back to 52, where the tire configuration is redefined. For the redefined tire, iterations to convergence are undertaken for various steady state rolling conditions until all sets of tire design parameters have been exhausted as at 76. At that time, the results of the various selected design parameters are compared for wear performance as at 78 to select the best design for that feature as at 78. The program is then terminated at 80.

It can thus be seen from the process of FIG. 7 that an appropriate wear analysis for various steady state footprint configurations for any of various tire configurations can be undertaken and iterated to convergence such that the abrasion energy dissipation or wear potential for each such tire configuration and associated solid state footprint can be determined. Improvement of wear potential can thus be easily attained.

Figure 8:
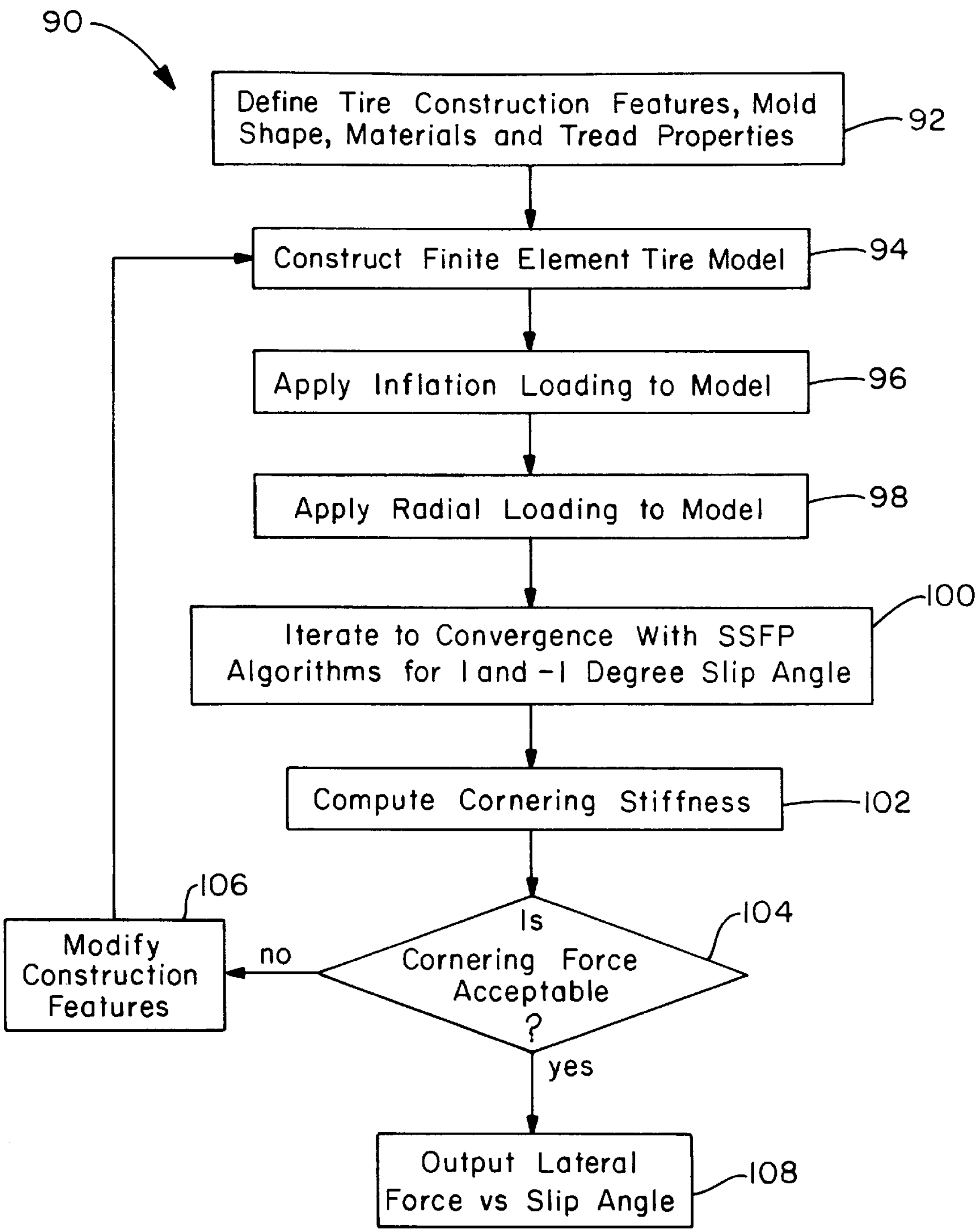
FIG. 8 is a flow chart for a cornering force design analysis according to the invention.

With reference now to FIG. 8, it can be seen that the methodology of the invention further extends to a method 90 for improved cornering for various designs in tire construction. As shown, the tire configuration, including its size, shape, materials and tread properties is selected at 92 and a finite element tire model thereof is devised at 94. Inflation and radial load are applied to the model at 96, 98 and iteration to convergence with the steady footprint state algorithm (designated is "SSFP" in FIG. 8) is undertaken at 100. As shown in FIG. 8, the iteration to converge is typically undertaken at two different slip angles, it being understood that various slip angles could be employed for iteration to convergence. Cornering stiffness is then computed at 102 and a determination is made at 104 as to whether the cornering force/stiffness is acceptable. If not, the construction or configuration of the tire is modified as at 106 and a new finite element tire model is generated at 94. The loop then continues with an iteration to convergence with the steady state footprint at the desired slip angle, the cornering stiffness or cornering force is bound to be acceptable at 104 in the lateral force as compared to slip angle is presented as at 108.

Accordingly, it can be seen from FIG. 8 that the cornering forces of various tire configurations, at present inflation and radial loading, can be determined under steady state rolling conditions, allowing a designer to optimize tire design for such feature.

Figure 9:
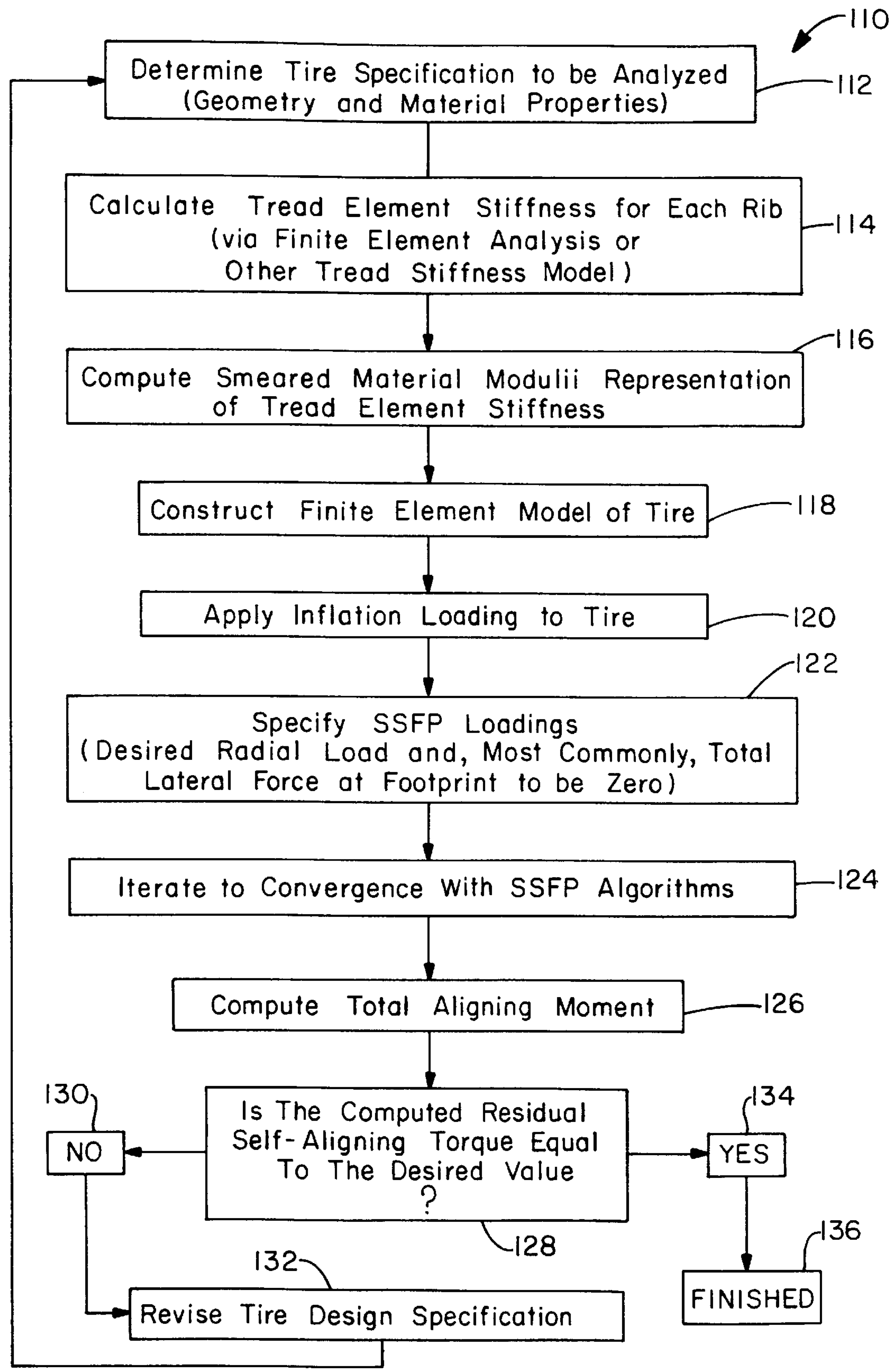
FIG. 9 is a flow chart for residual self aligning torque design analysis according to the invention.

With reference now to FIG. 9, it can be seen that the concept of the invention extends to the implementation of steady state footprint analysis to designs for residual self aligning torque, the process therefor being designated generally by the numeral 110. Those skilled in the art will appreciate that residual self aligning torque is a design feature that is usually specified by a customer and varies with different vehicle/tire applications. In accordance with the invention, a steady state footprint finite analysis may be used to calculate the residual self aligning torque for a proposed tire design and, if the calculated value of such torque is not equal to the desired value, the tire design parameters, such as dimensions and material properties, can be altered. The steady state footprint is then run again to determine if the torque of the newly altered design is closer to the desired value. A shown in FIG. 9, the specifications of the tire to be analyzed, as to geometry and material properties, is established at 112 and the tread element stiffness for each rib is calculated at 114. Those skilled in the art will appreciate that rib stiffness may be determined by finite element analysis or appropriate tread stiffness models as known in the art. A material modulii representation of the tread element stiffness is then computed at 116 such that a finite element model of the tire itself may be generated at 118. With the finite element model of the tire so defined, the inflation loading of the tire is set at 120 and the steady state footprint loading is set at 122. Iteration to convergence with the steady state footprint algorithm (designated as "SSFP" in FIG. 9) is undertaken at 124 and the total aligning moment is calculated at 126. If the computed residual self aligning torque is not equal to the desired value as determined at 128, a decision is made at 130 to revise the tire design specifications at 132 and loop again through the process just described until the computed residual self aligning torque equals the desired value. In other words, if the residual self aligning torque is not that which is desired, the tire specification and tread element stiffness must be reestablished and iteration to convergence with the steady state footprint be undertaken until the computed residual self aligning torque equals the desired value. When that determination is made as at 134, the process 110 is completed.

Thus it can be seen that the objects of the invention has been satisfied by the technique and process presented above. By establishing a desired set of steady state footprint conditions, iterations to convergence can be undertaken, with resultant tire configurations and parameters defined to satisfy such convergence. Accordingly, tire design optimization, wear, cornering and self aligning torque characteristics can be attained.

While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. A method for designing pneumatic tires for rolling conditions, comprising:

generating a finite element tire model;

applying a first set of variables to said tire model;

comparing steady state footprint conditions resulting from said application of said first set of variables to said tire model against predetermined footprint constraints to determine if the steady state footprint conditions and said footprint constraints have converged;

incrementing a set of control variables and repeating said step of comparing until said steady state footprint conditions and said footprint constraints have converged, wherein said steps of comparing and incrementing comprise the step of iterating to convergence with steady state footprint algorithms at a set slip angle; and designing the pneumatic tire utilizing said converged footprint constraints.

2. The method according to claim 1, wherein said first set of variables is selected from the group comprising radial load, slip angle, camber angle and inflation pressure.

3. The method according to claim 2, wherein said finite element tire model comprises a tire footprint formed from a matrix of nodes in contact with a support surface.

4. The method according to claim 3, wherein said step of incrementing said set of control variables makes adjustments to selected ones of a vertical position of said footprint, a lateral position of said footprint and a fore/aft position of said footprint.

5. The method according to claim 3, wherein said step of incrementing said set of control variables makes adjustments to selected ones of a lateral force upon said tire model, an effective rolling radius of said tire model, a lateral position of leading edge node points, and fore/aft positions of said leading edge node points.

6. The method according to claim 1, wherein said steps of comparing and incrementing comprise iterating to convergence steady state footprint algorithms employing finite friction in the footprint.

7. The method according to claim 6, further comprising the step of computing abrasion energy dissipation in said footprint to establish an associated wear potential.

8. The method according to claim 7, further comprising the step of changing said first set of variables and thereafter computing said abrasion energy for said changed first set of variables.

9. The method according to claim 8, further comprising the step of changing said finite element tire model and thereafter computing said abrasion energy for said changed tire model.

10. The method according to claim 1, further comprising the step of computing cornering stiffness.

11. The method according to claim 10, further comprising the step of altering said finite element tire model and repeating said steps of iterating to convergence and computing cornering stiffness.

12. A method for designing pneumatic tires for rolling conditions, comprising:

generating a finite element tire model;

applying a first set of variables to said tire model;

comparing steady state footprint conditions resulting from said application of said first set of variables to said tire model against predetermined footprint constraints to determine if the steady state footprint conditions and said footprint constraints have converged; and incrementing a set of control variables and repeating said step of comparing until said steady state footprint conditions and said footprint constraints have converged; and computing a residual aligning torque.

13. The method according to claim 12, wherein computed residual self aligning torque is compared to a desired value.

14. The method according to claim 13, further comprising the step of modifying said finite element tire model if said residual self aligning torque does not satisfy said desired value and thereafter repeating said step of computing.

* * * * *